US009166700B2

(12) United States Patent
Gripp et al.

(10) Patent No.: US 9,166,700 B2
(45) Date of Patent: Oct. 20, 2015

(54) TUNABLE RECEIVER

(75) Inventors: Jurgen Gripp, Westfield, NJ (US); John Edward Simsarian, New York, NY (US); Martin Zirngibl, Middletown, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 745 days.

(21) Appl. No.: 12/751,990

(22) Filed: Mar. 31, 2010

(65) Prior Publication Data

US 2011/0229137 A1  Sep. 22, 2011

Related U.S. Application Data

(60) Provisional application No. 61/315,961, filed on Mar. 21, 2010.

(51) Int. Cl.
*H04B 10/06* (2006.01)
*H04B 10/61* (2013.01)
(Continued)

(52) U.S. Cl.
CPC .............. *H04B 10/613* (2013.01); *H04B 10/61* (2013.01); *H04B 10/611* (2013.01);
(Continued)

(58) Field of Classification Search
CPC .. H04B 10/611; H04B 10/612; H04B 10/613; H04B 10/614; H04B 10/615
USPC ................................................ 398/202–214
See application file for complete search history.

(56) References Cited

U.S. PATENT DOCUMENTS

2002/0131426 A1 * 9/2002 Amit et al. ................... 370/401
2004/0080753 A1 * 4/2004 McAlexander et al. ...... 356/484
(Continued)

FOREIGN PATENT DOCUMENTS

CN  101369851 A  2/2009
EP    2026478 A1  2/2009
(Continued)

OTHER PUBLICATIONS

Guerrero N et al; "Experimental 2.5 Gbit/s QPSK WDM coherent phase modulated radio-over-fibre link with digital demodulation by a K-means algorithm", 35th European Conference on Optical Communication, 2009, Vienna, Austria; IEEE, Piscataway, NJ, USA, Sep. 20, 2009.
(Continued)

*Primary Examiner* — Dzung Tran
(74) *Attorney, Agent, or Firm* — Mendelsohn, Drucker & Dunleavy, P.C.; Yuri Gruzdkov

(57) ABSTRACT

Embodiments for optical communication are provided in which tunable receiver selects and demodulates a first channel of a WDM signal. An example receiver includes a tunable local oscillator for generating a local oscillator signal approximately centered at a first channel wavelength. An optical hybrid of the receiver receives at a first input a wavelength-division-multiplexed (WDM) signal with a M-ary modulation scheme, wherein M is an integer greater than 2, and at a second input the local oscillator signal. A plurality of detectors detect in-phase and quadrature components of the first channel wavelength output of the optical hybrid, which are digitizing by a plurality of analog-to-digital converters. A digital signal processor processes the digitized in-phase and quadrature components in order to recover data carried by the first channel of the WDM signal.

20 Claims, 3 Drawing Sheets

(51) Int. Cl.
*H04J 14/02* (2006.01)
*H04J 14/06* (2006.01)

(52) U.S. Cl.
CPC ......... *H04B 10/6161* (2013.01); *H04J 14/021* (2013.01); *H04J 14/0204* (2013.01); *H04J 14/0227* (2013.01); *H04J 14/06* (2013.01); *H04J 14/0257* (2013.01); *H04J 14/0283* (2013.01)

(56) References Cited

U.S. PATENT DOCUMENTS

| | | | |
|---|---|---|---|
| 2004/0208541 A1* | 10/2004 | Gripp et al. | 398/45 |
| 2005/0186933 A1 | 8/2005 | Trans | |
| 2006/0120733 A1* | 6/2006 | Tucker et al. | 398/204 |
| 2008/0038001 A1* | 2/2008 | Becker et al. | 398/204 |
| 2008/0145066 A1* | 6/2008 | Hoshida | 398/205 |
| 2010/0008679 A1* | 1/2010 | Cole et al. | 398/185 |
| 2010/0074632 A1* | 3/2010 | Zhou | 398/208 |
| 2010/0098438 A1* | 4/2010 | Prat Goma et al. | 398/203 |
| 2010/0142955 A1* | 6/2010 | Yu et al. | 398/72 |
| 2011/0002689 A1* | 1/2011 | Sano et al. | 398/44 |
| 2012/0134667 A1* | 5/2012 | Westlund et al. | 398/25 |

FOREIGN PATENT DOCUMENTS

| | | |
|---|---|---|
| JP | H05347603 A | 12/1992 |
| JP | 2008153863 A | 7/2008 |
| JP | 2009296596 A | 12/2009 |
| WO | 02/13432 A1 | 2/2002 |
| WO | WO2010007003 A1 | 1/2010 |
| WO | 2010/080721 A1 | 7/2010 |
| WO | WO2010128577 A1 | 11/2010 |
| WO | PCT/US2011/027514 | 6/2011 |

OTHER PUBLICATIONS

Simsarian J E et al: "Fast-tuning 22b-Gb/s intradyne receiver for optical packet networks", Optical Fiber Communication (OFC), Collocated National Fiber Optic Engineers Conference, 2010, Conference on (OFC/NFOEC); IEEE, Piscataway, NJ USA, Mar. 21, 2010.
Japanese Notice of Rejection; Mailed Sep. 17, 2013 for corresponding JP Application No. JP 2013-501285.
Korean Notice of Preliminary Rejection; Mailed Oct. 15, 2013 for corresponding KR Application No. KR 100108703.
Winzer, P. J., et al., "Spectrally Efficient Long-Haul Optical Neworking Using 112-Gb/s Polarization-Multiplexed 16-QAM" Journal of Lightwave Technology, vol. 28, No. 4, Feb. 15, 2010, pp. 547-556.
Hauske, F. N., et al., "Optical Performance Monitoring in Digital Coherent Receivers," Journal of Lightwave Technology, vol. 27, No. 16, Aug. 15, 2009, pp. 3623-3631.
Notice of Preliminary Rejection; Mailed Oct. 15, 2013 for the corresponding KR Application No. 10-2012-7027180.
Renaudier, J. et al., "Linear Fiber Impairments Mitigation of 40Gbit/s Polarization-Multiplexed QPSK by Digital Processing in a Coherent Receiver," Jan. 1, 2008, JLT vol. 6, No. 1, pp. 36-42.
Notice of Final Rejection; Mailed May 12, 2014 for related KR Application No. KR 10-2012-7027180.
Chinese Office Action; Mailed Sep. 29, 2014 for corresponding CN Application No. 201180015037.6.
Chinese Search Report; Mailed Sep. 29, 2014 for the corresponding CN Application No. CN201180015037.6.

* cited by examiner

TUNABLE RECEIVER

CROSS-REFERENCE TO RELATED APPLICATION

This application claims priority of Provisional Application Ser. No. 61/315,961 which was filed on Mar. 21, 2010.

FIELD OF THE INVENTION

The invention relates to optical transmission systems, and, in particular, to systems, apparatuses and techniques for digital coherent detection of a multi-channel optical signal.

BACKGROUND INFORMATION

Existing wavelength division multiplexed (WDM) networks create point-to-point communication channels between two nodes, which is wasting bandwidth if the connection requires less than a full wavelength of bandwidth.

Existing networks also use time-division multiplexing (TDM) or packet-based architectures such as Ethernet or resilient packet ring (RPR) to share a wavelength between nodes. This solution requires optical to electrical to optical conversion at each node of the wavelength being shared. This solution limits the bandwidth that can be added at each node because transit traffic must be processed by the transponder, exhausting available add/drop bandwidth.

Digital coherent detection is considered as a promising technique for future high-speed optical transmission because of its high receiver sensitivity and capability to compensate for transmission impairments such as chromatic dispersion (CD) and polarization-mode dispersion (PMD), which critically impact the performance of high-speed transmission. While 100-Gb/s Ethernet is currently being researched and developed for next-generation optical transport systems, Terabit/s Ethernet has already been mentioned as a future direction for optical transport systems.

SUMMARY OF THE INFORMATION

The following presents a simplified summary of the disclosed subject matter in order to provide an understanding of some aspects of the disclosed subject matter. This summary is not an exhaustive overview of the disclosed subject matter and is not intended to identify key or critical elements of the disclosed subject matter not to delineate the scope of the disclosed subject matter. It is intended to present some concepts in a simplified form as a prelude to the more detailed description that is discussed later.

Provided are embodiments of systems, apparatuses and methods for sharing the bandwidth of a wavelength between multiple nodes on the network that can accommodate bursty data traffic and has the capability of multicast.

Embodiments for optical communication are provided in which tunable receiver selects and demodulates a first channel of a WDM signal. One example receiver includes a tunable local oscillator for generating a local oscillator signal approximately centered at a first channel wavelength. An optical hybrid of the receiver receives at a first input a wavelength-division-multiplexed (WDM) signal with a M-ary modulation scheme, wherein M is an integer greater than 2, and at a second input the local oscillator signal. A plurality of detectors detect in-phase and quadrature components of the first channel wavelength output of the optical hybrid, which are digitizing by a plurality of analog-to-digital converters. A digital signal processor (DSP) processes the digitized in-phase and quadrature components in order to recover data carried by the first channel of the WDM signal.

In one embodiment, the tunable local oscillator is configured to generate the local oscillator signal based on a wavelength schedule. The wavelength schedule may be based on input queue length information received from optical system nodes. The wavelength schedule may be based on a medium-access-control protocol (MAC).

In one embodiment, the optical hybrid is a polarization-diversity 90-degree optical hybrid. In another embodiment, the plurality of detectors are balanced detectors, single ended detectors or a combination thereof. The DSP may include at least one module configured to perform at least one of front-end corrections, chromatic dispersion compensation, clock recovery, upsampling, adaptive equalization, frequency recovery, and timing recovery.

In one embodiment, the WDM signal is polarization-division-multiplexed (PDM) and the DSP includes an adaptive equalization module configured to perform filtering for source separation of mixed signal polarizations into orthogonal transmit polarizations. The filtering may be finite impulse response (FIR) filtering. The filtering may be infinite impulse response (IIR) filtering.

In one embodiment, the adaptive equalization module includes a constant-modulus algorithm (CMA) module configured to perform a three-stage CMA to adapt finite impulse response (FIR) filter coefficients without a need for a training sequence (blind adaptation). The receiver CMA module may include a first stage submodule for simultaneously processing in a separate branch each polarization of the first channel wavelength output of the optical hybrid, a second stage submodule for optimizing both polarizations of the first channel wavelength output in each branch independently until one branch converges; and a third stage submodule for utilizing FIR filter coefficients from the converged branch to processes both polarizations.

In another embodiment, the receiver further includes memory for storing at least a portion of the digitized in-phase and quadrature components output by the analog-to-digital converters. In a further embodiment, the DSP is configured to recover data carried by the first channel of the WDM signal using a stored portion of the digitized in-phase and quadrature components after adaptive equalization efforts result in convergence.

One example method includes tuning a local oscillator to approximately a first of a plurality of channel wavelengths, obtaining a wavelength-division-multiplexed (WDM) signal with a M-ary modulation scheme, wherein M is an integer greater than 2; and selecting a first channel of the WDM signal based on the local oscillator. The example method also includes detecting in-phase and quadrature components of the first channel, digitizing the in-phase and quadrature components, and processing the digitized in-phase and quadrature components in order to recover data carried by the first channel of the WDM signal.

The method may be tuned based on a wavelength schedule. In one embodiment, the wavelength schedule is based on input queue length information received from optical system nodes. In another embodiment, the wavelength schedule is based on a medium-access-control protocol (MAC).

Processing the digitized in-phase and quadrature components may include at least one of performing front-end corrections, compensating for chromatic dispersion, recovering a clock, upsampling, performing adaptive equalization, recovering a frequency, and recovering timing. In one embodiment, the WDM signal is polarization-division-multiplexed (PDM) and processing the digitized in-phase and quadrature components includes performing filtering for source separation of mixed signal polarizations into orthogonal transmit polarizations. The filtering may be finite or infinite impulse response filtering.

In one embodiment, the filtering performed is a three-stage CMA to adapt finite impulse response (FIR) filter coefficients without a need for a training sequence. The filtering may include simultaneously processing in a separate branch each polarization of the first channel, optimizing both polarizations of the first channel in each branch independently until one branch converges, and processing both polarizations of the first channel utilizing FIR filter coefficients from the converged branch.

In one embodiment, the method also includes storing at least a portion of the digitized in-phase and quadrature components of the first channel. The method may also include processing the portion of the digitized in-phase and quadrature components that was stored in order to recover data carried by the portion after performing adaptive equalization on the first channel.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present invention, and wherein.

DETAILED DESCRIPTION

Various example embodiments will now be described more fully with reference to the accompanying figures, it being noted that specific structural and functional details disclosed herein are merely representative for purposes of describing example embodiments. Example embodiments may be embodied in many alternate forms and should not be construed as limited to only the embodiments set forth herein.

It will be understood that, although the terms first, second, etc. may be used herein to describe various elements, these elements should not be limited by these terms since such terms are only used to distinguish one element from another. For example, a first element could be termed a second element, and, similarly, a second element could be termed a first element, without departing from the scope of example embodiments. As used herein the description, the term "and" is used in both the conjunctive and disjunctive sense and includes any and all combinations of one or more of the associated listed items. It will be further understood that the terms "comprises", "comprising,", "includes" and "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which example embodiments belong. It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
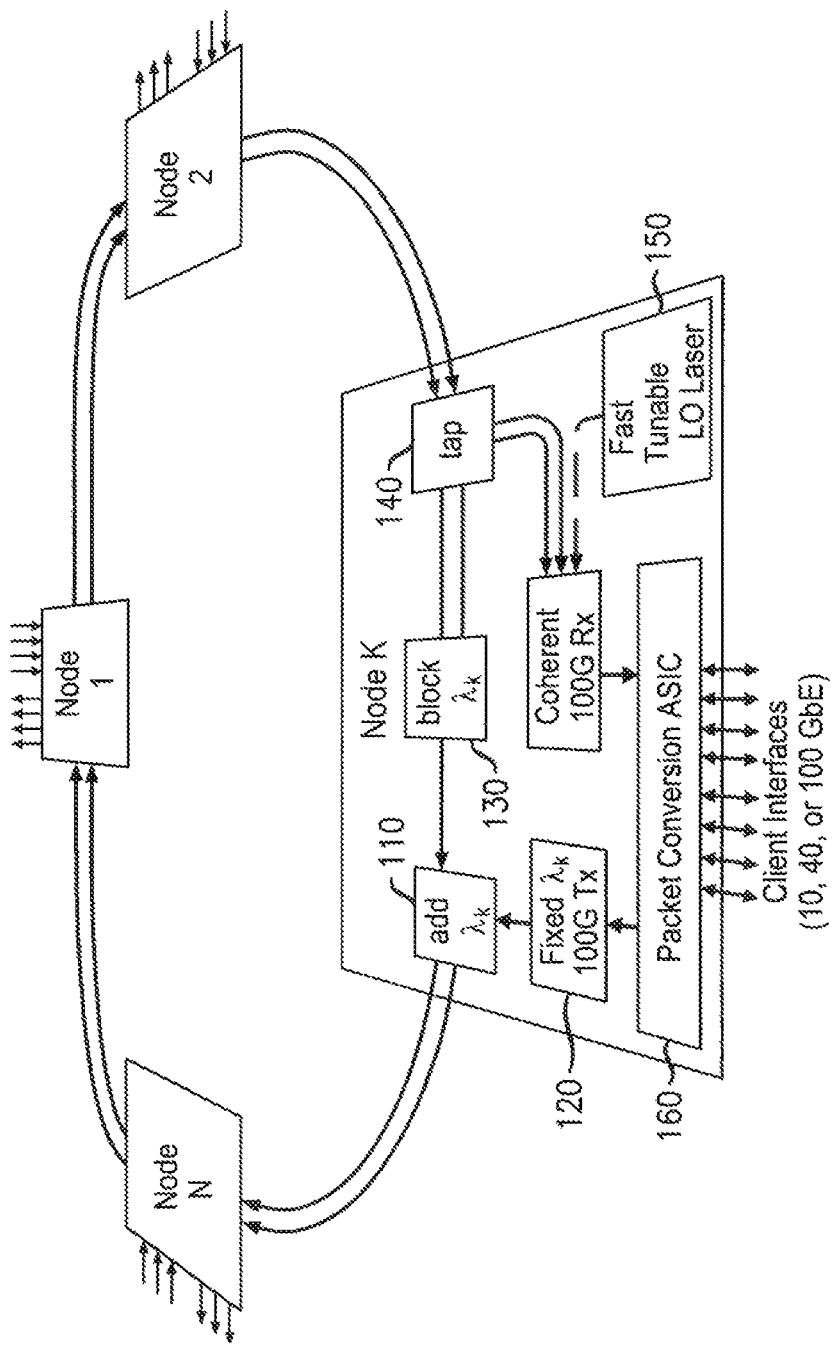
FIG. 1 is a schematic diagram of an example optical packet ring in which an example tunable receiver according to the principles of the invention may be deployed.

FIG. 1 is a schematic diagram of an example optical packet ring in which an example tunable receiver according to the principles of the invention may be deployed. The ring makes use of coherent optical communications. Each node transmits data packets using a continuous-wavelength laser tuned to a unique wavelength that identifies the node. The data packets being transmitted at the continuous wavelength are destined to different nodes in the network. Each node has an optical power splitter so that it receives all of the continuous wavelength transmissions from every other node. A node chooses a particular data packet that is destined to it by rapidly tuning its local oscillator to the appropriate wavelength to demodulate that data packet.

Nodes in the network share wavelengths by rapidly tuning their local oscillators (LOs) to the appropriate wavelengths. By allowing wavelength sharing, the connectivity of the network can be achieved with fewer optical transponders than would be required in a traditional WDM network, where each connection requires a dedicated transponder at each node. The wavelength sharing is also achieved without electronic processing of the traffic bypassing a node. Electronic processing of the bypass traffic limits the amount of bandwidth that can be added at a node and can result in higher power consumption from the additional optical to electrical conversions and data processing.

Prior optical packet architectures use transmitters that change wavelength rapidly instead of receivers, as in embodiments according to the invention. The wavelength-tuning transmitter configuration has gaps in the optical data stream when optical packets are not added to the wavelength or are dropped from the data stream. The missing packets can adversely affect the performance of optical amplifiers in the network and can lead to large power transients and penalties in the system. Another advantage of example embodiments according to the principles of the invention is that wavelengths can be easily shared between multiple endpoints, naturally allowing data broadcast capability.

The network requires a control plane to coordinate the tuning of the local oscillator receivers so that the nodes receive the intended data transmissions. There are a variety of different options for the control-plane implementation. In one embodiment, the nodes distribute their input queue length information to all other nodes, and each node calculates the wavelength schedule according to a known algorithm. This mode of operation would create semi-static bandwidth connections, similar to TDM connections that can be varied in magnitude as traffic demands change. In another embodiment, an out-of-band control channel that each node electronically processes could be utilized for scheduling. The control channel would contain the header information for every data packet arriving at the node. Based on that information, each node could implement a media-access-control (MAC) protocol to transmit data packets into the network. This mode of operation is efficient for networks carrying a large fraction of bursty data traffic.

One embodiment of the invention implements the coherent network in a ring configuration. Rings are often deployed in metropolitan area service provider networks. As shown in FIG. 1, each node (Node 1, Node 2, ... Node k, ... Node N)

adds 110 traffic into the ring with a fixed-wavelength transmitter 110 with the wavelength from the ring being blocked 130 before the insertion. For example, Node k bocks wavelength k received from Node 2 and adds wavelength k to the ring for delivery to node N. While only four distinct nodes in number are illustrated, the ring may contain N nodes where N is an integer.

The node (Node k as illustrated) receives all of the wavelengths on the ring, which are tapped 140 so they can be provided to the receiver. All of the wavelengths on the ring are combined with light from a fast wavelength-tunable local oscillator (LO) laser 150 that selects the channel and data packet for demodulation. In this example, the bitrate for each wavelength is 100 Gb/s, which will be commonly deployed in forthcoming WDM optical networks. However, other bitrates for the wavelength such as 10 Gb/s, 40 Gb/s and the like can be used in other embodiments.

Each node also contains packet conversion electronics that performs two main functions. One function is to convert client traffic coming from external equipment that adheres to standards such as Ethernet or Optical Transport Network (OTN) and the like to the ring optical data packet format. For example, a packet conversion ASIC 160 can be utilized to convert the client traffic format. The other function of the electronics at the node will be to process the digitized waveforms at the receiver to accomplish data recovery and compensation of impairments such as chromatic dispersion and to encode data packets for transmission.

Optical amplifiers such as Erbium-doped fiber amplifiers (EDFAs) (not shown) may also be used in the ring network. Note that the wavelengths used for optical data packets can be made practically indistinguishable from other wavelengths carrying continuous data for point-to-point connections. Therefore, the network can comingle different types of traffic in different wavelengths on the fiber. This capability allows the coherent optical data packet wavelengths to share the same fiber infrastructure as existing systems, so that a new optical fiber and amplifier infrastructure does not need to be deployed. The receiver does require an optical tap 140 that drops all of the wavelengths to the receiver. Existing reconfigurable optical add-drop multiplexers (ROADMs) may have this capability, or this capability may be added in an upgrade to an existing network node.

Figure 2:
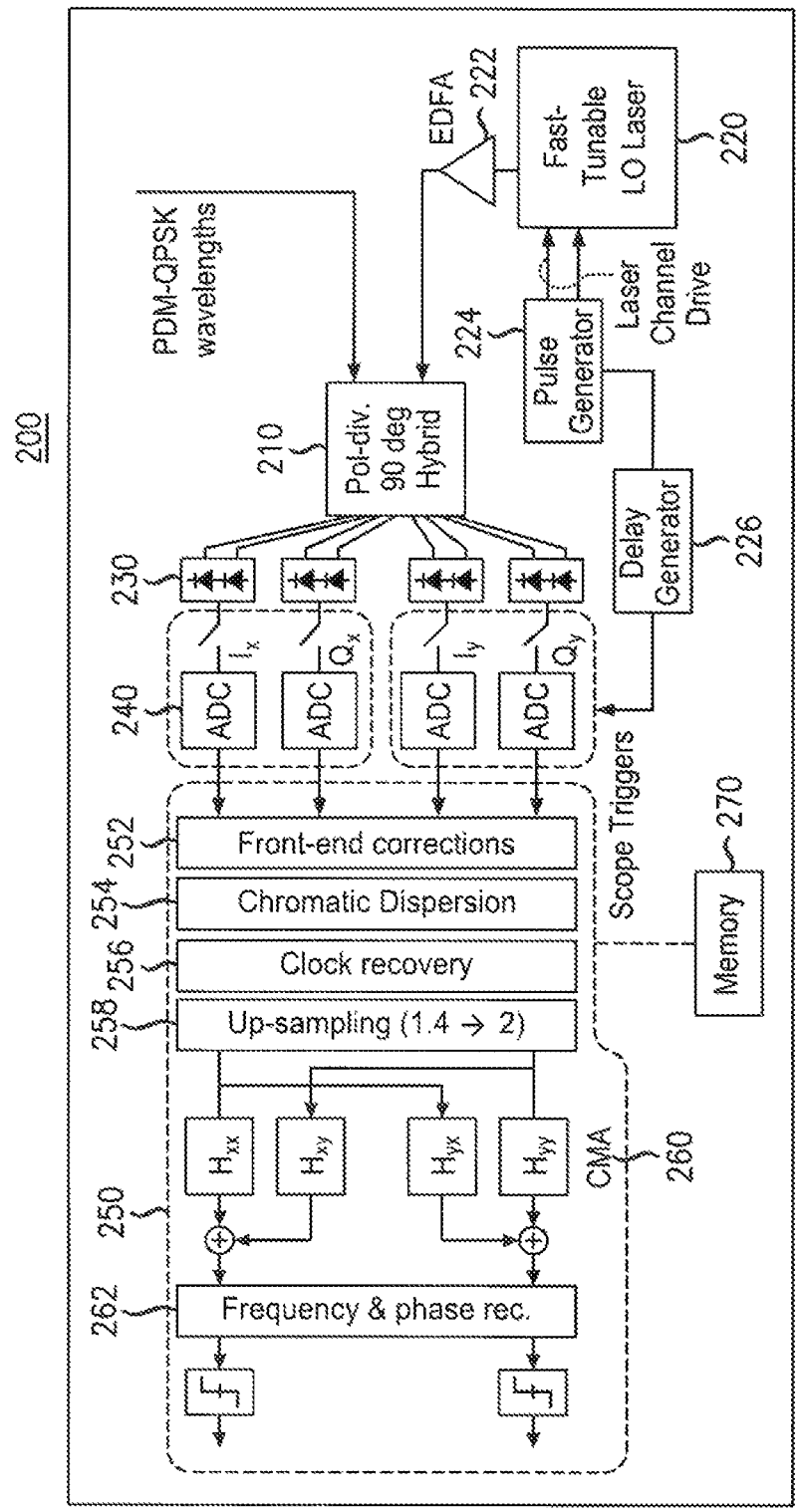
FIG. 2 is schematic diagram of an example receiver according to the principles of the invention for receiving a multi-channel optical signal.

FIG. 2 is schematic diagram of an example receiver according to the principles of the invention for receiving a multichannel optical signal. In one embodiment, the receiver 200 is a rapidly-tunable coherent receiver. In one embodiment of the invention, the receiver uses a digital intradyne architecture. At the receiver, the WDM signal wavelengths enter an optical hybrid 210, for example a polarization-diversity 90-degree optical hybrid, together with a fast-tunable LO from a LO laser 220.

In one embodiment, the tunable local oscillator is configured to generate the local oscillator signal based on a wavelength schedule. The wavelength schedule may be based on input queue length information received from optical system nodes. The wavelength schedule is based on a medium-access-control protocol (MAC).

The LO may also be amplified, by for example an Erbium Doped Fiber Amplifier. In addition, the WDM signal may have a M-ary modulation scheme, where M is an integer greater than 2. For example, the WDM signal may have QPSK modulation. The optical hybrid is followed by a plurality of detectors, for example four balanced detectors. The plurality of detectors may be balanced detectors, single ended detectors or a combination thereof. No optical filters are used prior to the receiver, so that all four WDM channels are incident simultaneously and the LO is used to select one of them.

The four outputs of the hybrid, Ix, Qx, Iy, Qy, representing the in-phase and quadrature components of the x and y polarized signals are digitized using analog-to-digital converters (ADCs) 240. Pulse generator 224 produces a drive current for the tunable laser 220. Optionally, the drive current from the pulse generator may be supplied to delay generator 226 for delay, after which the delayed drive current is provided as a trigger for the ADCs.

After the ADCs 240, the signal may be processed digitally by a digital signal processor (DSP) 250 which performs one or more of the following: front-end corrections 252, chromatic dispersion compensation 254, clock recovery 256, upsampling 258, adaptive equalization 260, and frequency recovery, phase recovery, timing recovery 262. Certain of these processing functions may be optional in various embodiments. For example for example, upsampling need not be performed in all embodiments. Note that the processing necessary to implement the named functionality may be implemented in and performed by a DSP module similarly named.

For example, the dispersion compensation module performs dispersion compensation on the channel being processed, the clock recovery module recovers the clock for the modulated channel, etc. For example, frequency recovery may include recovering the difference or offset between the LO and the channel and front end corrections may include adjusting the ratio for the splitting of channel by the optical hybrid. For instance, the adaptive equalization module 260 may be configured to perform filtering for source separation of mixed signal polarizations into orthogonal transmit polarizations. The filtering may be finite impulse response (FIR) filtering in one embodiment. In another embodiment, the filtering may be infinite impulse response (IIR) filtering. In one embodiment, the adaptive equalization module is configured to perform a butterfly filter with four 16-tap T/2-spaced FIR filters (Hxx, Hxy, Hyx, Hyy) to accomplishes source separation of the two received mixed signal polarizations into the two orthogonal transmit polarizations.

Figure 3:
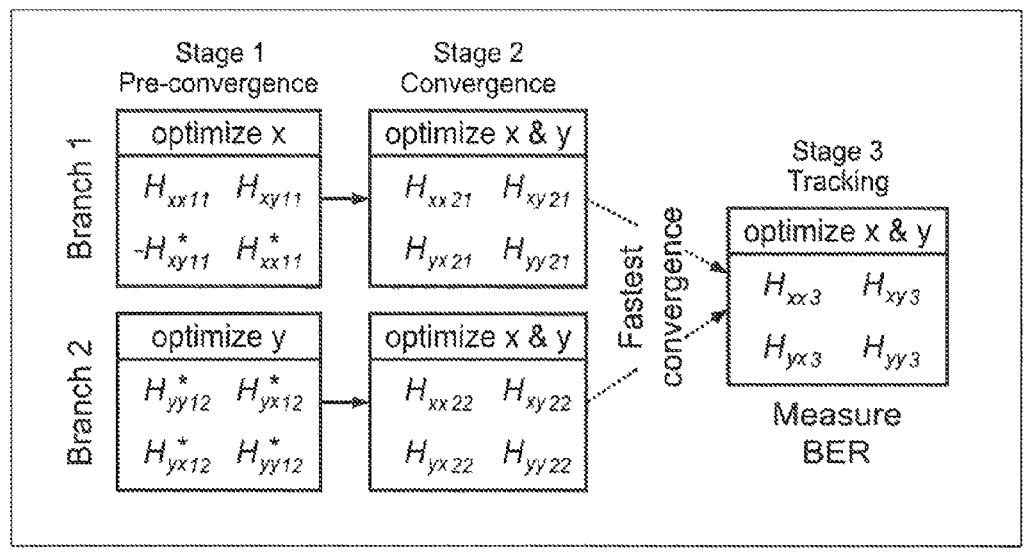
FIG. 3 is graphical illustration of a three-stage blind constant modulus algorithm module according to the principles of the invention.

FIG. 3 is graphical illustration of a three-stage blind constant modulus algorithm module according to the principles of the invention. The three-stage constant-modulus algorithm provided is used to adapt the FIR filter coefficients without the need for a training sequence (blind adaptation). In its original single-stage version, the CMA has a known singularity problem that results in the recovery of only a single signal polarization tributary for some initial polarization angles. For the case of continuous, non-packet transmission, this degenerate condition can be avoided at the cost of a slower setup time by rotating the polarization starting conditions in the digital domain until a non-degenerate starting position is found. However, this is not acceptable for a packet receiver without sufficient random-access memory (RAM), such that fast polarization decomposition is needed to rapidly lock onto a data packet.

Therefore, a three-stage CMA as illustrated in FIG. 3 may be used. The first stage sets the initial polarization for the second stage so that both signal polarizations are independently recovered. In general, the result of convergence depends on the choice of initial FIR tap values such that by choosing proper initial tap values for the tributaries the singularity problem for CMA may be avoided. For example, the channel transfer matrix of the fiber may be given by a unitary matrix in frequency domain, the inverse of which is also a unitary matrix in frequency domain. This relationship can be utilized to determine one tributary FIR filter tap values according to the other so that the singularity problem can be addressed. This relationship can be utilized to determine initial tap values so that the two tributaries should not degenerate.

In addition to preventing the degenerate condition, it is also desirable that the bit error ratio (BER) converge quickly. The inventors have found that the CMA convergence time depends on the polarization that is being optimized in stage 1 of the CMA (x or y), and so have split the CMA into two simultaneous processing branches to determine the faster-converging of the two (cf. FIG. 3). Branch 1 of stage 1 optimizes for the x polarization, for example, with four sub-equalizers adjusted according to the stochastic gradient algorithm, dependent on the convergence parameter and the output field port of the first stage equalizer. Because of this relationship, the transfer function of the first stage equalizer can be normalized to a unitary matrix. Meanwhile branch 2 of stage 1 optimizes for the y polarization.

Stage 2 then optimizes both polarizations independently until both polarizations of one branch converge. Those FIR filter coefficients from the faster stage are then passed to stage 3, where the already-converged CMA tracks both polarizations and the data is recovered.

If the packet receiver has a sufficient amount of RAM that can be accessed at the line rate, then the digitized waveforms out of the ADCs could be stored in memory until the digital FIR filters converge to the data stream. Once convergence is achieved, the data could be retrieved from memory, so that no information is lost while the CMA or other recovery algorithm converges.

Various of the functions described above with respect to the exemplary method are readily carried out by special or general purpose digital information processing devices acting under appropriate instructions embodied, e.g., in software, firmware, hardware or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared.

Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module. For example, functional modules of the DSP and the other logic circuits can be implemented as an ASIC (Application Specific Integrated Circuit) constructed with semiconductor technology and may also be implemented with FPGA (Field Programmable Gate Arrays) or any other hardware blocks.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

What is claimed is:

1. A receiver comprising:
   a tunable local oscillator configurable to select for demodulation any one of a plurality of wavelength-division-multiplexed (WDM) channels of a multi-channel optical signal by being tuned, based on a wavelength schedule that is based on input queue length information received from optical system nodes, to generate a local oscillator signal approximately centered at a WDM-channel wavelength corresponding to a WDM channel selected for demodulation, said WDM channel selected for demodulation being a WDM channel of said plurality of WDM channels; and
   an optical hybrid configurable to receive at a first input the local oscillator signal, and at a second input the multi-channel optical signal, the optical hybrid being configured to output in-phase and quadrature components of the WDM channel selected for demodulation; and
   wherein the receiver is configured to recover data carried by the WDM channel selected for demodulation based on the in-phase and quadrature components output by the optical hybrid.

2. The receiver of claim 1, wherein the optical hybrid is a polarization-diversity 90-degree optical hybrid.

3. The receiver of claim 1, wherein the wavelength schedule is based on a medium-access-control protocol (MAC).

4. The receiver of claim 1, further comprising:
   a plurality of detectors configured to detect the in-phase and quadrature components output by the optical hybrid;
   a plurality of analog-to-digital converters configured to digitize the in-phase and quadrature components detected by the plurality of detectors; and
   a digital signal processor (DSP) configured to process the digitized in-phase and quadrature components in order to recover the data carried by the WDM channel selected for demodulation.

5. The receiver of claim 4, wherein the DSP includes at least one module configured to perform at least one of front-end corrections, chromatic dispersion compensation, clock recovery, upsampling, adaptive equalization, frequency recovery, and timing recovery.

6. The receiver of claim 4, wherein the multi-channel optical signal is polarization-division-multiplexed (PDM), and wherein the DSP includes an adaptive equalization module configured to perform filtering for source separation of mixed signal polarizations into orthogonal transmit polarizations.

7. The receiver of claim 6, wherein the adaptive equalization module includes a constant-modulus algorithm (CMA) module configured to perform a three-stage CMA to adapt finite impulse response (FIR) filter coefficients without a need for a training sequence.

8. The receiver of claim 7, wherein the CMA module comprises:
   a first stage submodule configured to simultaneously process, in a separate respective branch, digital signals corresponding to each polarization of the WDM channel selected for demodulation;
   a second stage submodule configured to optimize, with respect to both polarizations of the WDM channel selected for demodulation, digital signals generated by the separate branches of the first stage submodule, with said optimization being performed independently for each of the separate branches until one branch converges; and a third stage submodule configured to utilize FIR filter coefficients from the converged branch to processes both polarizations.

9. The receiver of claim 4, further comprising:

memory for storing at least a portion of the digitized in-phase and quadrature components output by the analog-to-digital converters.

10. The receiver of claim 9, wherein the DSP is further configured to recover the data carried by the WDM channel selected for demodulation using the stored portion of the digitized in-phase and quadrature components after adaptive equalization efforts result in convergence.

11. The receiver of claim 1, wherein said WDM channel selected for demodulation is modulated using a M-ary modulation scheme, wherein M is an integer greater than 2.

12. A communication method using a multi-channel optical signal having a plurality of wavelength-division-multiplexed (WDM) channels, the method comprising:

providing a tunable local oscillator configurable to select for demodulation any one of said plurality of WDM channels of the multi-channel optical signal by being tunable, based on a wavelength schedule that is based on input queue length information received from optical system nodes, to generate a local oscillator signal approximately centered at a WDM-channel wavelength corresponding to a WDM channel selected for demodulation;

configuring an optical hybrid to produce, at an output thereof, in-phase and quadrature components of the WDM channel selected for demodulation by causing the local oscillator signal to be applied to a first input of the optical hybrid, and the multi-channel optical signal to be applied to a second input of the optical hybrid; and configuring a received having the tunable local oscillator and the optical hybrid to recover data carried by the WDM channel selected for demodulation using the in-phase and quadrature components produced at the output of the optical hybrid.

13. The method of claim 12, further comprising configuring the receiver to:

detect the in-phase and quadrature components produced at the output of the optical hybrid using a plurality of detectors;

digitize the in-phase and quadrature components detected by the plurality of detectors using a plurality of analog-to-digital converters; and process, using a digital signal processor (DSP), the digitized in-phase and quadrature components in order to recover the data carried by the WDM channel selected for demodulation.

14. The method of claim 13, wherein the sub-step of configuring the receiver to process includes configuring the receiver to carry out at least one of performing front-end corrections, compensating for chromatic dispersion, recovering a clock, upsampling, performing adaptive equalization, recovering a frequency, and recovering timing.

15. The method of claim 13, wherein the multi-channel optical signal is polarization-division-multiplexed (PDM), and wherein the sub-step of configuring the receiver to process includes configuring the receiver to perform filtering for source separation of mixed signal polarizations into orthogonal transmit polarizations.

16. The method of claim 15, wherein the sub-step of configuring the receiver to perform said filtering includes configuring the receiver to perform a three-stage constant-modulus algorithm (CMA) to adapt finite impulse response (FIR) filter coefficients without a need for a training sequence.

17. The method of claim 15, wherein the sub-step of configuring the receiver to perform said filtering comprises configuring the receiver to:

simultaneously process, in a separate respective branch of a first stage submodule of a CMA module, digital signals corresponding to each polarization of the WDM channel selected for demodulation;

optimize, with respect to both polarizations of the WDM channel selected for demodulation, digital signals generated by the separate branches of the first stage submodule, such that optimization is performed independently for each of the separate branches until one branch converges; and process both polarizations of the first channel utilizing FIR filter coefficients from the converged branch.

18. The method of claim 13, further comprising:

configuring the receiver to store in a memory at least a portion of the digitized in-phase and quadrature components output by the analog-to-digital converters.

19. The method of claim 12, wherein said WDM channel selected for demodulation is modulated using a M-ary modulation scheme, wherein M is an integer greater than 2.

20. A system comprising:

a plurality of nodes, each node configured to communicate with each other node via an optical signal path, and each node including:

a respective transmitter tuned to a respective fixed wavelength unique to that node and selected from a plurality of wavelength-division-multiplexed (WDM) channel wavelengths corresponding to a plurality of WDM channels;

a respective tunable local oscillator configurable to select for demodulation any one of the plurality of WDM channels by being tuned to generate a local oscillator signal approximately centered at a WDM-channel wavelength, from said plurality of WDM-channel wavelengths, corresponding to the WDM channel selected for demodulation; and respective optical hybrid configurable to receive at a first input the local oscillator signal, and at a second input a multi-channel optical signal including the WDM channel selected for demodulation, the respective optical hybrid being configured to output in-phase and quadrature components of the WDM channel selected for demodulation; and wherein each node is configured to recover data carried by the WDM channel selected for demodulation based on the in-phase and quadrature components output by the respective optical hybrid.

* * * * *

UNITED STATES PATENT AND TRADEMARK OFFICE
CERTIFICATE OF CORRECTION

| | | |
|---|---|---|
| PATENT NO. | : 9,166,700 B2 | Page 1 of 1 |
| APPLICATION NO. | : 12/751990 | |
| DATED | : October 20, 2015 | |
| INVENTOR(S) | : Gripp et al. | |

It is certified that error appears in the above-identified patent and that said Letters Patent is hereby corrected as shown below:

In the claims

In column 9, line 37, replace the word "received" with the word "receiver".

Signed and Sealed this
Fifth Day of July, 2016

Michelle K. Lee
*Director of the United States Patent and Trademark Office*